April 7, 1925.
B. G. VAN STIJN
1,532,968
FRUIT SORTING DEVICE
Filed April 12, 1924
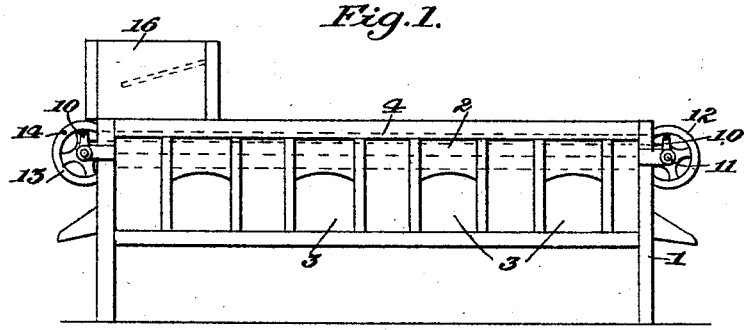
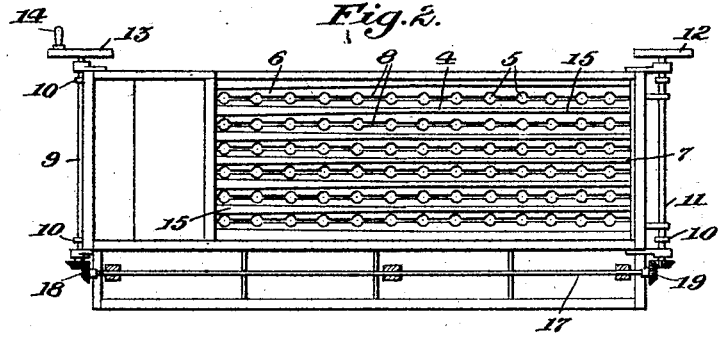
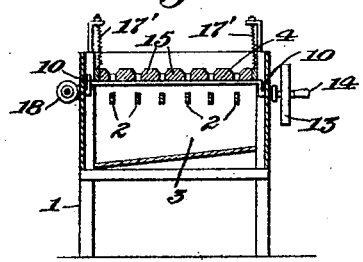
Inventor:
Bernardus Gerradus van Stijn
Wm H. Babcock & Son
Att'ys.

Patented Apr. 7, 1925.

1,532,968

UNITED STATES PATENT OFFICE.

BERNARDUS GERRADDUS VAN STIJN, OF LISSE, NETHERLANDS.

FRUIT-SORTING DEVICE.

Application filed April 12, 1924. Serial No. 706,143.

*To all whom it may concern:*

Be it known that I, BERNARDUS GERRADDUS VAN STIJN, manufacturer, a subject of the Queen of the Netherlands, residing at Lisse, in the Kingdom of the Netherlands, have invented certain new and useful Improvements in Fruit-Sorting Devices, of which the following is a specification.

Fruit sorting devices with sorting tables provided with a certain number of sorting apertures, the sizes of which increase in each series from the inlet point up to the outlet point and are connected together in the longitudinal direction of the table by slots through which laths pass during the sorting, are already known.

In such machines, as known, the sorting table is stationary and the laths receive an upward and downward and a to and fro motion which is such that they remove the fruit or bulbs which are too large for the sorting apertures, whereupon they roll farther upon the inclined sorting table.

Such rolling of the fruit and bulbs on the sorting table is a drawback, inasmuch as it may produce bruises. Furthermore the fruit and bulbs are made to drop through the sorting apertures, whilst the laths are still descending, failing which they would run the risk of being caught between the ascending laths and the lower face of the table, which may lead to the undesirable result of damaging or losing the fruit or stopping the working.

There is also that further disadvantage that first the fruit or bulbs run the risk of being damaged when passing through the sorting apertures and dropping on the descending laths and secondly that the laths can only perform their motions slowly and, to be effective, must stop a moment in their lowest position. Moreover, the sorting table is narrower at the starting point than at the finishing point, the result being that the fruit or bulbs which emerge from the hopper cannot spread sufficiently at first and cause a congestion which seriously interferes with the operation.

The object of this invention is to do away with the above drawbacks. The invention consists in that, during the sorting, the laths are stopped, whilst the sorting table performs an ascending and descending and to and fro motion.

With the arrangement which forms the subject matter of this invention, the fruit or bulbs are raised from the sorting table, when the latter descends, by stationary laths upon which they rest, a result, which according to the invention, may still be enhanced by providing a dorsal projection between the consecutive lines of the sorting apertures in the longitudinal direction of the table.

Consequently the sorting table performs its return motion under the fruit or bulbs without the latter participating therein.

During the following ascending motion of the sorting table, the fruit or bulbs which pass through the sorting apertures still remain lying on the laths during the passage of the sorting table. They drop from the same, however, so soon as there is sufficient space between the lower face of the table and the laths, owing to the fact that they no longer have any lateral support. The fruit or bulbs which do not pass through the sorting table are raised from the laths by the table, participate in the following onward motion of the latter, upon which they remain lying without moving, until, upon the subsequent descending motion of the table, they are detached therefrom by the laths.

The fruit or bulbs, with the device under this invention are therefore displaced along the sorting table, owing to the fact that they participate in the onward motion of the table, but not in the back motion. If the sorting table which may be of the same width at the starting point as at the finishing point, is arranged horizontally or with a slight inclination, any rolling of the fruit or bulbs is prevented, as well as any danger of damage connected therewith.

Furthermore it should be observed that the fruit or bulbs already raised on the laths when, during the ascending motion of the sorting table, an empty space is produced between the lower face of the latter and the laths. They drop from it so soon as the space is sufficiently large, so that it is also impossible, even when the sorting table is in rapid motion, for the fruit or bulbs to be caught between the laths and the descending table, inasmuch as they have already dropped from the laths before the table begins its ascending motion. Moreover there is nothing in the path followed by the fruit or bulbs which drop into collecting vats, so that, on said path again, there is no danger of damage.

The drawing exemplifies the invention as follows:

Fig. 1 is a lateral elevation;
Fig. 2 is a plan and
Fig. 3 is a transverse section.

In the machine illustrated, the frame 1 carries the arrangement of the laths 2 which in this case are six in number and arranged in the longitudinal direction of the frame. Said laths occupy a position above a series of compartments 3 each of which is provided with a slanting bottom and is intended to collect the sorted produce.

Above the laths is arranged the sorting table 4 horizontally positioned and provided with a certain number of series of sorting apertures 5, the diameters of which increase from the inlet towards the outlet line. The diameter of said apertures is proportionate to the size of the fruit or bulbs to be sorted. In order to permit the sorting, with a single machine, of the fruit or bulbs of very different sizes, the sorting table may be made interchangeable and arranged in a frame for the purpose, so that by changing the sorting tables, each of which is provided with a different set of sorting apertures, it is possible to sort the fruit or the bulbs of a distinct average diameter.

These series of apertures 5 are cut by the longitudinal slots 8 intended to allow the passage, with the necessary play, of the laths 2 when the sorting table is in motion.

The sorting table has an ascending, descending and to and fro motion imparted by the crank axle 9 provided with two bends 10 connected with its frame and which is such that when the table has reached the lowest position, the laths have passed through the slots and project slightly therefrom, whilst when the table occupies its highest position, the laths are under the table and with the upper face at some distance from the latter.

A corresponding crank axle 11 is arranged at the outlet end of the sorting table and carries a flywheel 12. The crank axle 11 is connected with the frame of the sorting table by means of bends, and to the crank axle 9 by means of the longitudinal shaft 17 and two sets of conical gears 18 and 19 (Fig. 2).

The driving crank axle also carries a flywheel 13 provided with a handle or crank 14 according to whether it is desired to use a belt or any other method of driving.

Between the longitudinal slots 8 and the series of apertures 5, dorsal projections 15 are arranged, whilst above the end of the inlet of the sorting table is provided the feeding receptacle or hopper 16 in which the fruit or bulbs to be sorted are thrown.

The projections or ridges 15 do not only prevent the fruit or bulbs from dropping from the laths, when not required, but they also serve to compel the fruit or bulbs to move in a straight line above the longitudinal slots until they have met the suitable sorting aperture.

In the arrangement illustrated, the sorting table is throughout of equal width, the dorsal projections 15 are widest at the inlet end, namely, where the sorting apertures are smallest, whilst as and when said apertures increase, namely backwards, said projections become thinner.

The frame of the sorting table may be hung on springs 17 (Fig. 3), the weight of the loaded table and the crank axle is thus partly counterbalanced and the crank axles move approximately as easily upwards as downwards.

Claims.

1. A fruit sorting machine comprising a movable table provided with graduated openings, means for imparting a four-motion feed to said table and means for imparting to objects on said table a step-by-step feed of said objects longitudinally of said table to a selective opening therethrough.

2. A fruit sorting machine comprising a movable table provided with graduated openings and slots connecting said openings, means for imparting a four-motion feed to said table, and slats adapted to pass into said slots to engage and support objects supported by the table during a part of the travel of said table.

3. A fruit sorting machine comprising, a movable table provided with graduated openings and slots connecting said openings, longitudinal members between said slots adapted to aid in positioning objects on said table, means for imparting to said table a four-motion feed, and slats adapted to pass into said slots and between said longitudinal members to engage and support objects supported by the table during a part of the travel of said table.

4. A fruit sorting machine comprising, a movable table provided with graduated openings and slots connecting said openings, means for imparting a four-motion feed to said table, and stationary slats adapted to extend through said slots to engage and support objects on said table during the rearward longitudinal, and a part of the lowering and rising movements of said table, whereby the objects on the table are first carried forward by the first or forward longitudinal movement of the table, then supported substantially out of contact with the table during its rearward travel and, finally, again picked up from the supporting slats by the table to be carried forward again by the table on its next forward longitudinal movement.

In testimony whereof, I have signed my name to this specification in the presence of two subscribing witnesses.

BERNARDUS GERRADDUS VAN STIJN.

Witnesses:
H. Y. HULSHOFF,
F. W. HULSHOFF.